United States Patent [19]

Kawabata

[11] Patent Number: 5,619,739
[45] Date of Patent: Apr. 8, 1997

[54] DIOPTER CORRECTING APPARATUS

[75] Inventor: Takashi Kawabata, Yokohama, Japan

[73] Assignee: Canon Kabushiki Kaisha, Tokyo, Japan

[21] Appl. No.: 454,086

[22] Filed: May 30, 1995

[30] Foreign Application Priority Data

Jun. 2, 1994 [JP] Japan .................................. 6-145623

[51] Int. Cl.⁶ ...................................... G03B 13/02
[52] U.S. Cl. ............................................ 396/382
[58] Field of Search ................... 354/410, 62, 219; 351/210; 396/51, 18, 373, 382

[56] References Cited

U.S. PATENT DOCUMENTS

| | | | |
|---|---|---|---|
| 4,300,818 | 11/1981 | Schachar | 351/210 |
| 4,828,381 | 5/1989 | Shindo | 354/62 X |
| 5,182,443 | 1/1993 | Suda et al. | 354/219 X |
| 5,335,035 | 8/1994 | Maeda | 354/219 |

FOREIGN PATENT DOCUMENTS

| | | |
|---|---|---|
| 63-206731 | 8/1988 | Japan . |
| 4138431 | 5/1992 | Japan . |
| 4138432 | 5/1992 | Japan . |

*Primary Examiner*—W. B. Perkey
*Attorney, Agent, or Firm*—Fitzpatrick, Cella, Harper & Scinto

[57] ABSTRACT

This specification discloses an apparatus in which data regarding the proper lens positions of a diopter correcting lens when an observer is wearing spectacles and when the observer is not wearing spectacles are pre-stored in a memory circuit, the presence or absence of the spectacles is detected by a detecting circuit for detecting the state of an anterior eye part, the data in the memory circuit are extracted in conformity with this state, and the diopter correcting lens is moved on the basis of these data.

9 Claims, 8 Drawing Sheets

DIOPTER CORRECTING APPARATUS

BACKGROUND OF THE INVENTION

1. Field of the Invention

This invention relates to an optical apparatus having diopter correcting means, and particularly to an optical apparatus having diopter correcting means suitable, for example, for a camera, binoculars or the like which is adapted to detect whether an observer wears spectacles or contact lenses and to automatically appropriately set the diopter of an optical system into which the observer looks.

2. Related Background Art

Generally, the correction of the diopter of an optical apparatus such as the finder of a camera or binoculars has been accomplished by manually moving a portion of an eyepiece optical system to adjust it to a position one can readily see.

Also, Japanese Laid-Open Patent Application No. 63-206731 proposes a finder apparatus adapted to detect a value related to the refractive power of the eye of an observer looking into a finder by an eye refractometer, and to effect the correction of the diopter of a finder optical system in conformity therewith.

On the other hand, as an apparatus having a similar optical construction, a camera having a visual axis detecting unit is proposed in Japanese Laid-Open Patent Application No. 4-138431 and Japanese Laid-Open Patent Application No. 4-138432.

These publications propose a camera having a visual axis detecting unit adapted to detect by a spectacle detecting portion provided in a portion of the camera whether a photographer is using spectacles, and to adjust the construction of light receiving means on the basis of a signal from the spectacle detecting portion.

In the above-described apparatus wherein diopter correction is manually effected, each time a state in which observation is done (hereinafter simply referred to as the observation state), such as whether the observer is observing while wearing spectacles or contact lenses or observing by the naked eye, changes, it is necessary to manually readjust the diopter, and this has led to the problem that operation is cumbersome.

Also, the finder apparatus of the aforementioned Japanese Laid-Open Patent Application No. 63-206731 is effective when highly accurate diopter correction is effected to many and unspecified observers, but it is too large-scale in apparatus construction as an apparatus for use by ordinary substantially limited observers. Particularly it has been difficult to apply it to an apparatus to the portability of which importance is attached.

Generally, to an observer who usually wears spectacles, there has been the problem that when conditions such as temperature and humidity are bad or suddenly change, the spectacles sometimes become clouded and any other apparatus than an apparatus which enables observation to be readily made in other observation state (for example, a state in which the observer has taken off the spectacles) is difficult to use.

SUMMARY OF THE INVENTION

The present invention has as its object the provision of an optical apparatus having diopter correcting means for detecting the observation state of an observer looking into an optical system, and moving at least a portion of the optical system on the basis of the observation state to thereby achieve the simplification of the whole apparatus and yet enable appropriate diopter correction to be readily effected even in a different observation state.

The present invention is characterized in that data regarding the proper lens positions of a diopter correcting lens when the observer is wearing spectacles and when the observer is not wearing spectacles are pre-stored in a memory circuit, the presence or absence of the spectacles is detected by a detecting circuit for detecting the state of an anterior eye part, the data in the memory circuit are extracted in conformity with this state, and the diopter correcting lens is moved on the basis of these data.

BRIEF DESCRIPTION OF THE DRAWINGS

FIG. 10 is comprised of FIGS. 10A and 10B showing flow charts when detecting the observation state.

DETAILED DESCRIPTION OF THE PREFERRED EMBODIMENTS

Figure 1:
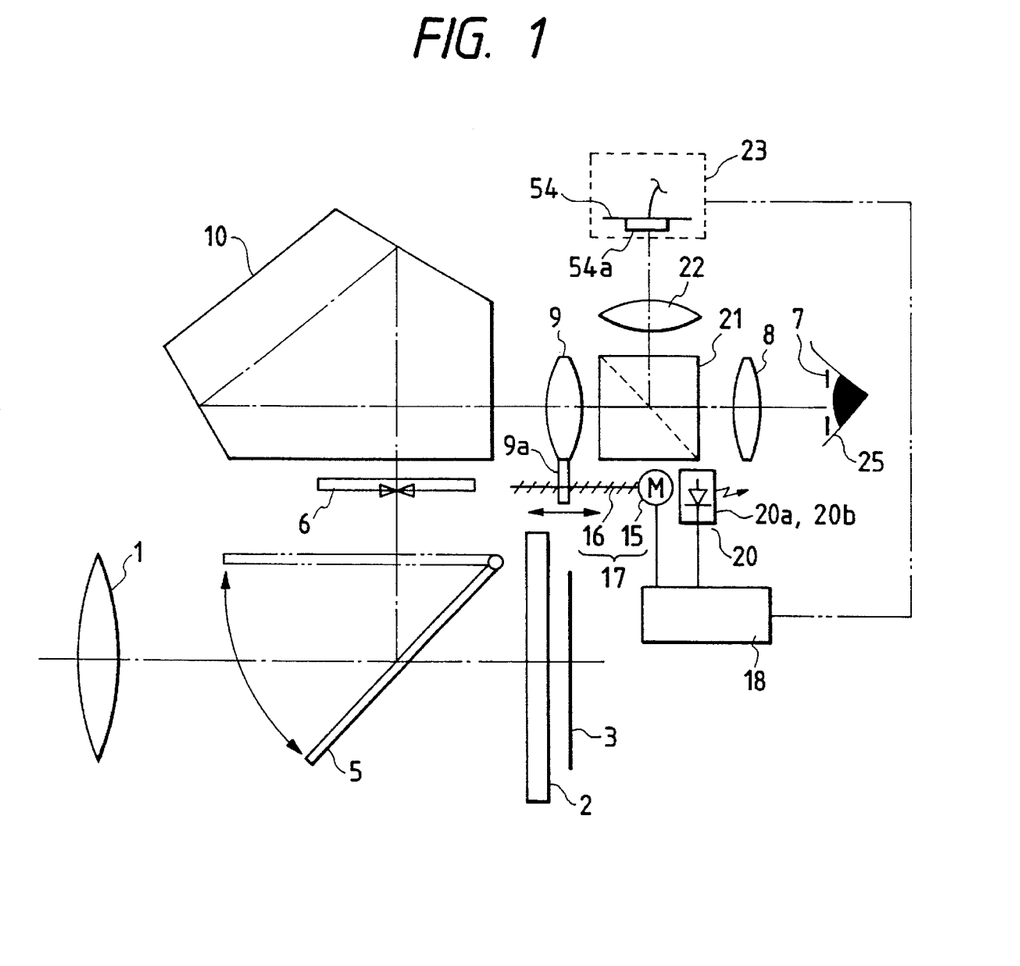
FIG. 1 is a schematic view showing the essential portions of Embodiment 1 of the present invention.
Figure 2:
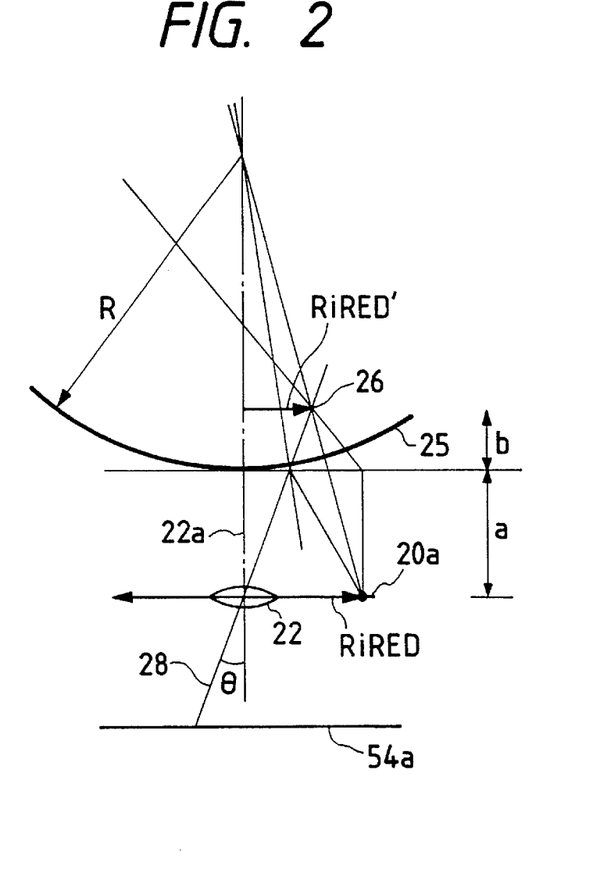
FIG. 2 is an optical illustration of an image formed on the light receiving surface of a detecting unit.
Figure 3:
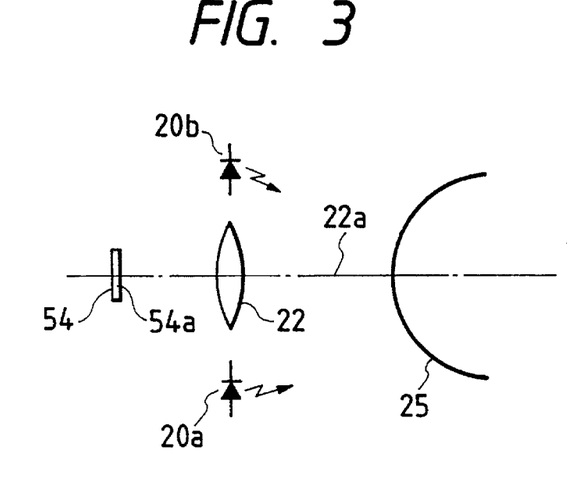
FIG. 3 is an illustration showing the positional relations among the element of FIG. 2.
Figure 4:
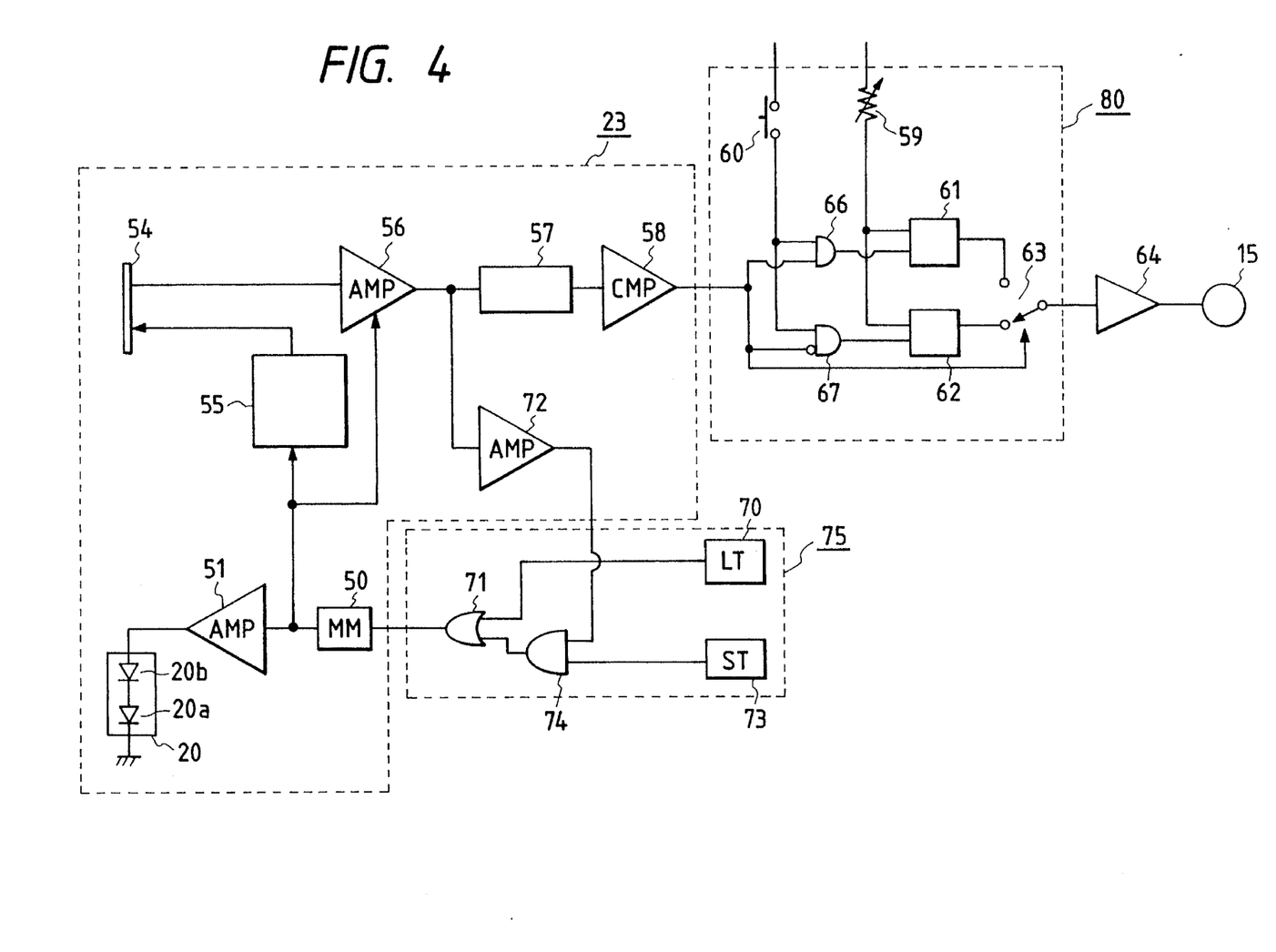
FIG. 4 is an illustration of diopter correcting means.

FIG. 1 is a schematic view showing the essential portions of Embodiment 1 of the present invention applied to a single-lens reflex camera. FIG. 2 is an optical illustration of an image formed on the light receiving surface of the detecting unit of FIG. 1, FIG. 3 is an illustration showing the positional relations among the elements of FIG. 2, and FIG. 4 is an illustration of diopter correcting means according to the present invention.

In FIG. 1, the reference numeral 1 designates a photo-taking lens for forming an object image, and the reference numeral 5 denotes a quick return mirror for changing over the optical path from the photo-taking lens 1. The reference numeral 2 designates a shutter (a focal plane shutter or the like) for controlling the amount of exposure light to film 3.

During exposure, the quick return mirror 5 is retracted upwardly (out of an exposure optical path) and a beam of light from the photo-taking lens 1 is directed onto the surface of the film 3 through the focal plane shutter 2 and forms an object image thereon.

The reference numeral 6 denotes a focusing screen disposed conjugately with the film 3 with respect to the beam of light from the photo-taking lens 1 through the quick return mirror 5.

During non-exposure, the quick return mirror 5 is positioned downwardly, i.e., in the beam of light from the photo-taking lens 1 (the position indicated by solid line in FIG. 1), and the beam of light is directed onto the surface of the focusing screen 6 and forms an object image thereon.

The reference numeral 10 designates a pentagonal prism which reflects and deflects the beam of light from the focusing screen 6 so that the object image on the surface of the focusing screen 6 may be observed as a positive erect image through eyepieces 8 and 9 which will be described later.

The eyepieces 8 and 9 direct the beam of light from the pentagonal prism 10 to an observer's eyeball. The eyepieces 8, 9 and the pentagonal prism 10 each constitute an element of a finder optical system (an optical system).

The observer observes the finder image from an observation position (eye point) 7 through the finder optical system.

The reference numeral 15 denotes a motor for diopter correction, and the reference numeral 16 designates a screw portion. The screw portion 16 threadably engaged with a portion of a holding member 9a for holding the eyepiece 9 is rotated by the motor 15, whereby the eyepiece 9 is moved in the direction of the optical axis to thereby adjust the diopter of the finder optical system. The motor 15 for diopter correction and the screw portion 16 each constitute an element of a driving unit 17.

The reference numeral 20 designates a light source having infrared light emitting diodes 20a and 20b which may, for example, be iRLED's. The reference numeral 21 denotes a light divider for reflecting part of reflected light from the observer's eyeball side and dividing it from the optical path of the finder optical system when a beam of light (a beam of infrared light) from the light source 20 is applied to the observer's eyeball side.

The reference numeral 22 denotes an imaging lens for directing the beam of infrared light from the light divider 21 onto the light receiving surface 54a of an image sensor 54 and forming a reflection image regarding the eyeball. The reflection image comprises a reflection image from the observer's pupil illuminated by the beam of light from the light source 20, positive reflection images of the infrared light emitting diodes 20a and 20b of the light source from the observer's eyeball or spectacles, or other corrective lenses.

The reference numeral 23 designates a detecting unit having the image sensor 54, the imaging lens 22, the light divider 21, the light source 20, etc. The detecting unit 23 detects the observer's observation state by the use of various reflection images formed on the light receiving surface 54a.

The reference numeral 18 denotes a control circuit including a memory unit. The control circuit obtains in advance data for correcting the diopter of the finder system, specifically the data of the positions at which the diopter correcting lens 9 should be when the observer wears spectacles and when the observer does not wear spectacles, in a manner which will be described later, and stores the data therein.

The detecting unit 23, the driving means 17 and the memory unit 18 together constitute an element of diopter correcting means.

In FIG. 2, the iRLED 20a of the light source 20 applies infrared light toward the observer side, i.e., toward the eyeball 25. This beam of light applied toward the observer side is reflected, for example, by the surface of the eyeball 25 and forms a virtual image 26, and a beam of light based on this virtual image 26 is directed to the image sensor 54 through the imaging lens 22, and the virtual image 26 is formed on the light receiving surface 54a of the image sensor 54 by the imaging lens 22.

The iRLED 20a is disposed so that the principal ray 28 of the beam of light forming the image on the light receiving surface 54a may have an inclination 8 with respect to the optical axis 22a of the imaging lens 22.

Also, as shown in FIG. 3, the iRLED 20b is disposed symmetrically with the iRLED 20a with respect to the optical axis 22a of the imaging lens 22 and illuminates the eyeball 25 so that the detection of the reflection image by the detecting unit 23 can be correctly effected even if the center of the eyeball 25 deviates a little from the optical axis 22a.

In the present embodiment, by the construction as described above, the beam of light from the light source 20 is applied to the observer side (the eyeball and the portion around it), and by the use of the reflected light from the observer side, the observer's observation state is detected by the detecting unit 23. The control circuit 18 selects one datum from among the data pre-stored in the memory unit on the basis of a signal from the detecting unit 23, for example, zero (such a datum which will cancel the present diopter correction) or a datum such as a second preset value, and uses this selected datum to drive the eyepiece 9 by the driving unit 17 and effect the correction of the diopter of the finder optical system.

The operation of the diopter correcting means in the present embodiment will now be described with reference to FIG. 4. In FIG. 4, the reference numeral 50 designates a mono-multivibrator which receives a trigger signal from a timer circuit 75 and outputs a pulse signal.

The pulse signal from the mono-multivibrator 50 is amplified by an amplifier 51 and turns on and off the iRLEDs 20a and 20b of the light source 20.

The image sensor 54 is driven by a drive control circuit 55 so as to be operatively associated with the light source 20, and picks up the reflection image of the light source passed through the observer's eyeball or spectacles and outputs an image signal.

The reference numeral 57 denotes an image measuring unit which obtains the image signal from the image sensor 54 through an amplifier 56 and measures the spacing between the two reflection images of the iRLEDs 20a and 20b.

The reference numeral 58 designates a comparator which compares the measured value by the image measuring unit 57 with a predetermined value, and if the spacing between the two reflection images is greater than a predetermined distance, judges that the position at which the reflection has taken place is near and the observer is using spectacles, and if the spacing is small, judges that the position at which the reflection has taken place is far and the observer is observing by the naked eye. The details of this will be described later. In conformity with the judged observation state, the comparator 58 outputs a High or Low signal. Here, it outputs Low for the naked eye, and outputs Low when the observer wears spectacles.

The signal from the comparator 58 is inputted to an AND gate 67 through the switch circuit 63, AND gate 66 and NOT gate of a memory unit 80.

The memory unit 80 receives the signal from the comparator 58 and one of latch circuits 61 and 62 is selected by the switch circuit 63. On the basis of data pre-stored in the selected latch circuit 61 or 62, the motor 15 is controlled through an amplifier 64, whereby the diopter correcting lens is moved.

The storage of the movement data of the diopter correcting lens 9 will now be described. This is an operation performed before actual photographing. For the storage of data into the memory unit 80, a switch 60 is first operated to make the input signals to AND gates 66 and 67 High. Thereby, the output of one of the AND gates 66 and 67 becomes High or Low in conformity with the signal from the comparator 58, i.e., the observation state.

In the latch circuit 61, 62 on that side on which the signal from the AND gate 66, 67 has become High, data are changed by the operation of the operating portion 59. At this time, by the observer operating the operating portion 59, the motor 15 is controlled through the latch circuit 61 or 62, the switch circuit 63 and the amplifier 64, whereby the diopter correcting lens is moved so that appropriate diopter may be obtained in the observation state. Thereafter, the switch 60 is operated to make the inputs of the AND gates 66 and 67 Low. Thus, the data at this time (the absolute position of the lens 9, the amount of driving of the motor 15, etc.) are maintained (stored) until the data are then changed in the latch circuits 61 and 62.

When the observer wears spectacles and closes the switch 60 to make the inputs of the AND gates 66 and 67 High and the observer looks into the finder, the output of the detecting unit 23 becomes High and therefore the output of the AND gate 66 becomes High, and by the operation of the operating portion 59, the lens is moved to effect optimum diopter correction, and the data at this time are stored in the latch circuit 61.

Likewise, when in the state of naked eye, the observer closes the switch 60 and looks into the finder, the output of the detecting unit 23 becomes Low and the output of the AND gate 67 becomes High. The operating portion 59 is then operated and data which provide appropriate diopter are stored in the latch circuit 62, whereafter the switch 60 is opened.

Thus, even when during actual photographing, the observer does not perform any special operation, if the observer looking into the finder wears spectacles, the latch circuit 61 will be selected by the switch circuit 63, and if the observer is in the state of naked eye, the latch circuit 62 will be selected so that appropriate diopter can be obtained.

A timer circuit 75 inputs a trigger signal to the monomultivibrator 50 on the basis of a long time timer 70 or a short time timer 73 to thereby effect the detection of the observation state at appropriate intervals.

The long time timer 70 intermittently transmits a trigger signal through an OR gate 71. At this time, the detecting unit 23 receives the trigger signal and when the beam of light applied from the light source 20 to the observer side is not reflected by the observer side and no reflection image is obtained, the detecting unit 23 judges that non-operation is going on, and intermittently effects the detection of the observation state.

Also, when the beam of light applied to the observer side is reflected by the observer side and a reflection image is properly obtained by the image sensor 54, the input to an AND gate 74 is made High through the amplifiers 56 and 57.

The AND gate 74 receives as an input a signal of relatively short intervals from the short time timer 73 and therefore, a trigger signal is transmitted at short intervals through the OR gate 71, and detailed detection is effected by the detecting unit 23. This detailed detection is effected until the input of the AND gate 74 becomes Low, that is, until non-operation. Thereby, saving of electric power is achieved in the entire apparatus.

In the present embodiment, diopter correction is automated as described above and therefore, there is realized a camera which can always be automatically changed over to diopter easy to see even during photographing with or without spectacles being worn by the observer.

Figure 5:
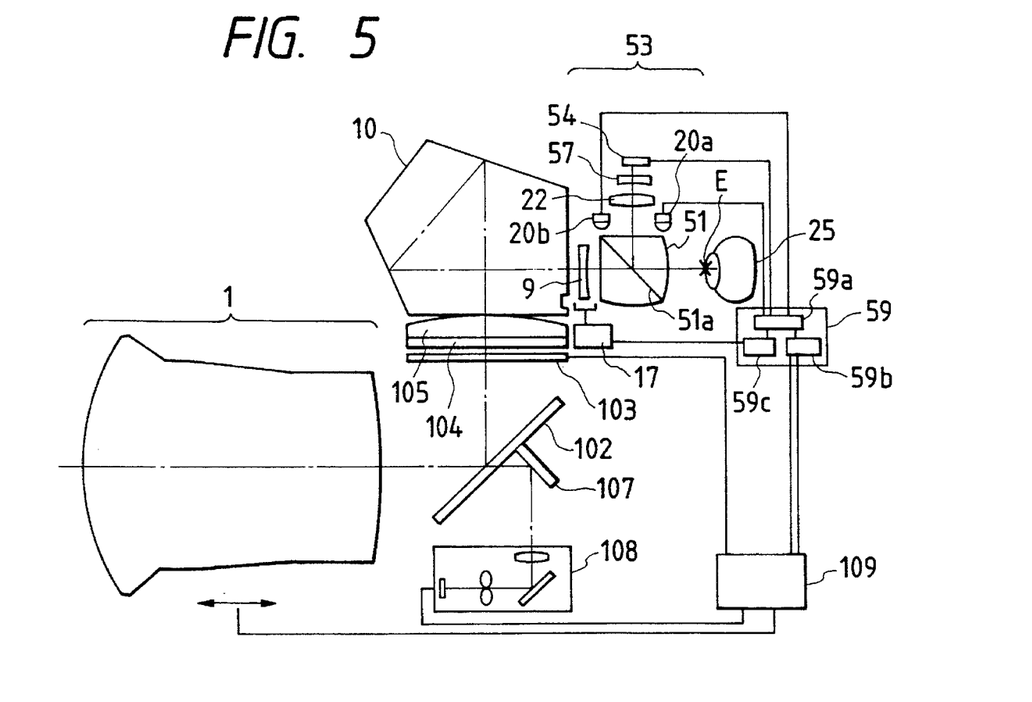
FIG. 5 is a schematic view showing the essential portions of Embodiment 2 of the present invention.
Figure 6:
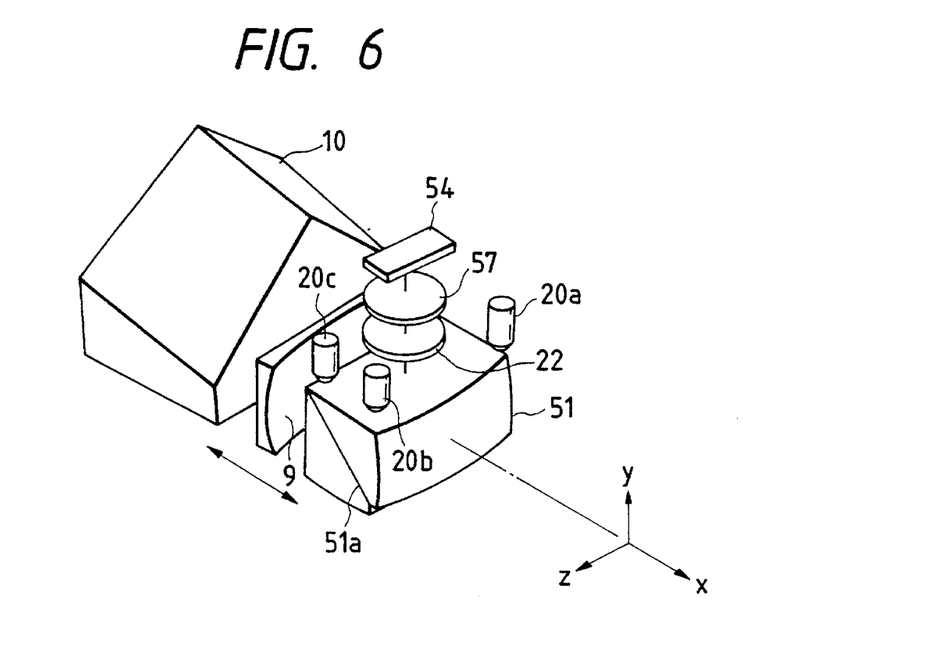
FIG. 6 is a schematic view showing the essential portions of a finder optical system.

FIG. 5 is a schematic view showing the essential portions of Embodiment 2 of the present invention applied to a camera having visual axis detecting means, and FIG. 6 is a schematic view showing the essential portions of the finder optical system of FIG. 5.

In these figures, the reference numerals 9 and 51 designate eyepieces which direct the beam of light from a pentagonal prism 10 to the observer's eyeball 25.

A dichroic mirror 51a transmitting visible light therethrough and reflecting infrared light is obliquely disposed in the eyepiece 51 and serves also as an optical path divider.

The reference characters 20a, 20b and 20c denote light sources, each of which comprises, for example, a light emitting diode or the like. The reference numeral 22 designates an imaging lens.

The reference numeral 54 denotes an image sensor comprising photoelectric element arrays disposed two-dimensionally. The image sensor 54 is disposed so as to be conjugate with the vicinity of the pupil of the eyeball 25 which is at a predetermined location (the location of the general eye point of an observer who does not use spectacles) with respect to the imaging lens 22 and the eyepiece 51.

The reference numeral 57 designates an auxiliary lens disposed so as to be removably insertable into an optical path. The auxiliary lens 57 is adapted to be retracted out of the optical path and adjust diopter when it is judged by a calculation processing unit which will be described later that the observer is not using spectacles.

The reference numeral 59 denotes a calculation processing unit having a processing portion 59a for processing the driving of the light sources 20 and a signal from the image sensor 54 to thereby find the observation environment, a visual axis calculating portion 59b for finding the observer's visual axis and gazing point on the basis of the signal from the image sensor 54 processed by the processing portion 59a, and a memory portion 59c for storing therein data for diopter correction. The imaging lens 22, the light sources 20, the image sensor 54 and the processing portion 59a each constitute an element of a detecting unit 53.

In the above-described construction, the elements 51, 20, 22, 59a, 59b, etc. together constitute eyeball visual axis detecting means. Also, the elements 51, 53, 59c, etc. together constitute diopter correcting means.

The reference numeral 1 designates a photo-taking lens, the reference numeral 102 denotes a quick return (QR) mirror, the reference numeral 103 designates a display element, the reference numeral 104 denotes a focusing screen, the reference numeral 105 designates a condenser lens, the reference numeral 107 denotes a sub-mirror, and the reference numeral 108 designates a multipoint focus detecting device which selects a plurality of areas in a photo-taking image field and effects focus detection.

The reference numeral 109 denotes a camera control device having the functions of driving the display element in the finder, focus detection calculation and lens driving.

In the present embodiment, part of the object light transmitted through the photo-taking lens 1 is reflected by the QR mirror 102 and forms an object image near the focusing screen 104. The object light diffused by the diffusing surface of the focusing screen 104 is directed to an eye point E through the condenser lens 105, the pentagonal prism 10 and the eyepieces 9, 51.

The display element 103 is, for example, a guest-host type liquid crystal element of a two-layer type which does not use a polarizing plate, and displays a distance measuring area (focus detecting position) in the field of view of the finder.

Also, part of the object light transmitted through the photo-taking lens 1 is transmitted through the QR mirror 102, is reflected by the sub-mirror 107 and is directed to the aforementioned multipoint focus detecting device 108 disposed in the bottom of the camera body. Further, on the basis of the focus detection information of the selected position of the multipoint focus detecting device 108 on the surface of the object, the axial forward movement (or the axial reverse movement) of the photo-taking lens 1 is effected by a photo-taking lens driving device, not shown, whereby focus adjustment is effected.

In the visual axis detection of the present embodiment, infrared light emitted from the infrared light emitting diodes 20a, 20b and 20c enters the eyepiece 51 from above as viewed in FIG. 5, is reflected by the dichroic mirror 51a and illuminates the observer's eyeball 25 located near the eye point E. Also, the infrared light reflected by the eyeball 25 is reflected by the dichroic mirror 51a and forms an image on the image sensor 54 while being converged by the imaging lens 22. Also, the processing by the calculation processing unit 59 is executed in accordance with the software of a microcomputer.

The gazing point information detecting in the calculation processing unit 59 is first transmitted to the display element 103 and the multipoint focus detecting device 108 through the camera control device 109. On the display element 103, the location gazed at by the observer is displayed in the finder of the camera, thus performing the function of confirming the gazing point (focus detection point).

Also, the focus detection of the point gazed at by the observer is effected in the multipoint focus detecting device 108 and focus adjustment is effected to an object being gazed at.

FIG. 6 is a perspective view showing the essential portions of the visual axis detecting means. The infrared light emitting diodes 20a, 20b and 20c for illumination are used in one set of two to detect the distance between the camera and the observer's eyeball, and in conformity with the posture of the camera, the detection of the horizontal position is effected by the infrared light emitting diodes 20a and 20b and the detection of the vertical position is effected by the infrared light emitting diodes 20b and 20c. Although camera posture detecting means is not shown in FIG. 6, posture detecting means utilizing a mercury switch or the like is effective.

Figure 7:
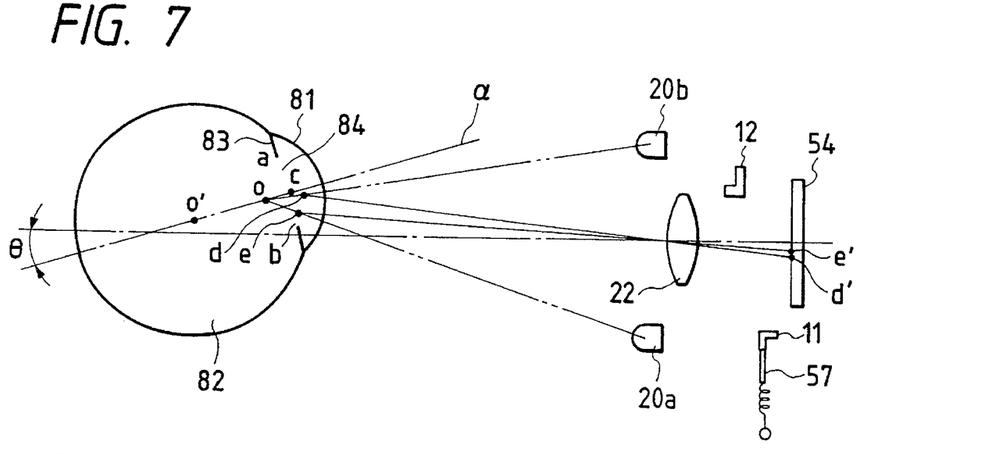
FIG. 7 is a developed illustration showing the optical path of the detecting unit when an observer is observing by the naked eye.
Figure 8:
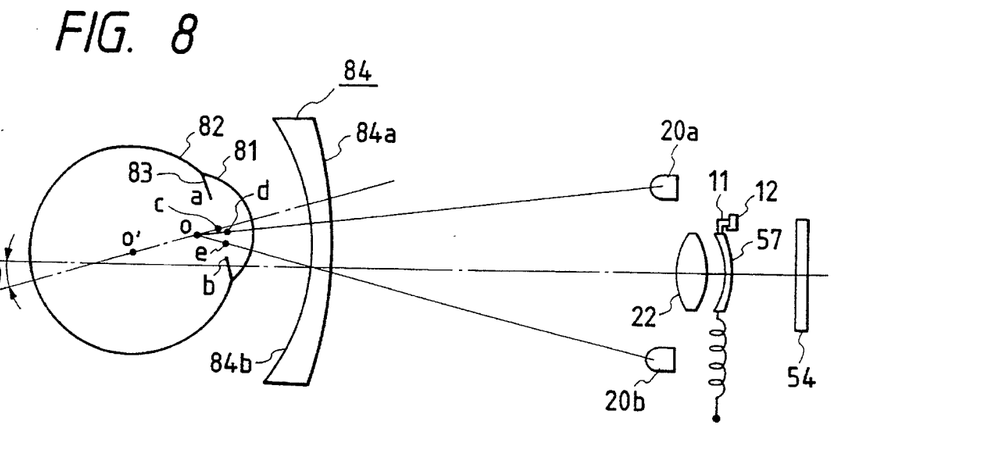
FIG. 8 is a developed illustration showing the optical path of the detecting unit when the observer is using spectacles.
Figure 9A:
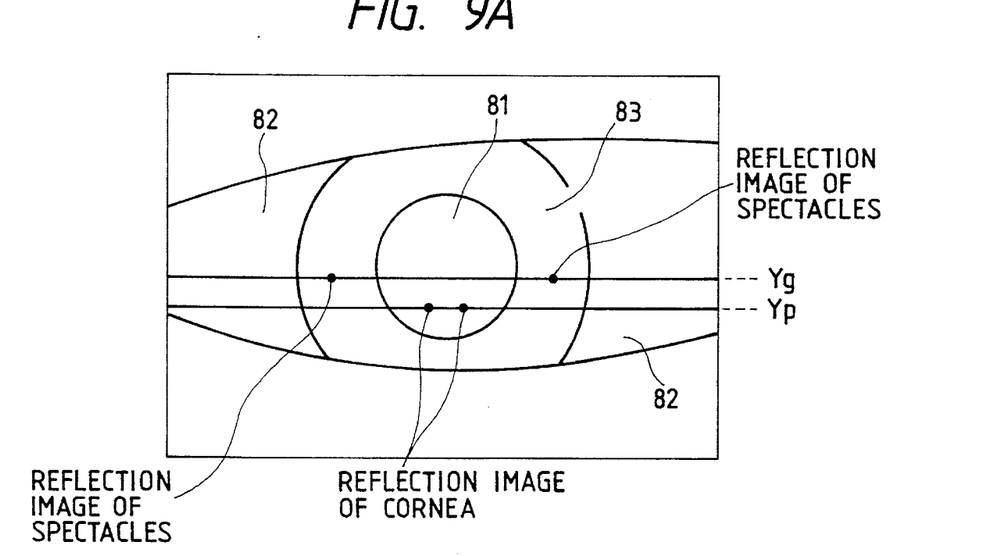
FIGS. 9A, 9B and 9C are illustrations of a refraction image formed on an image sensor and output intensity obtained from the reflection image.
Figure 9B:
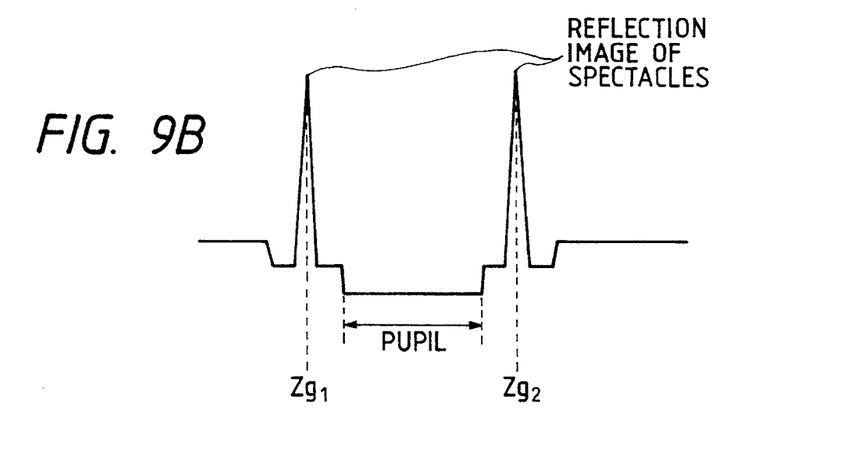
Figure 9C:
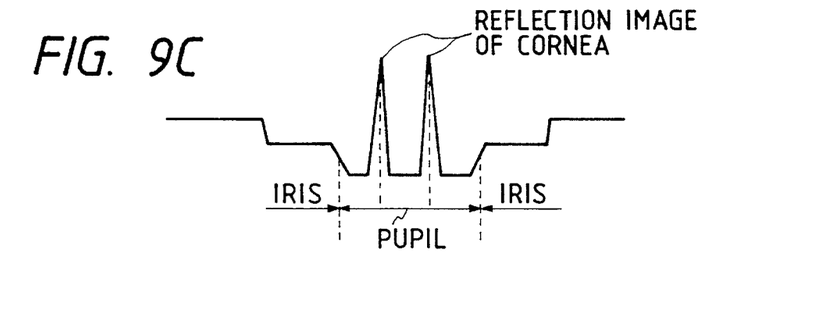
Figures 10, 10A:
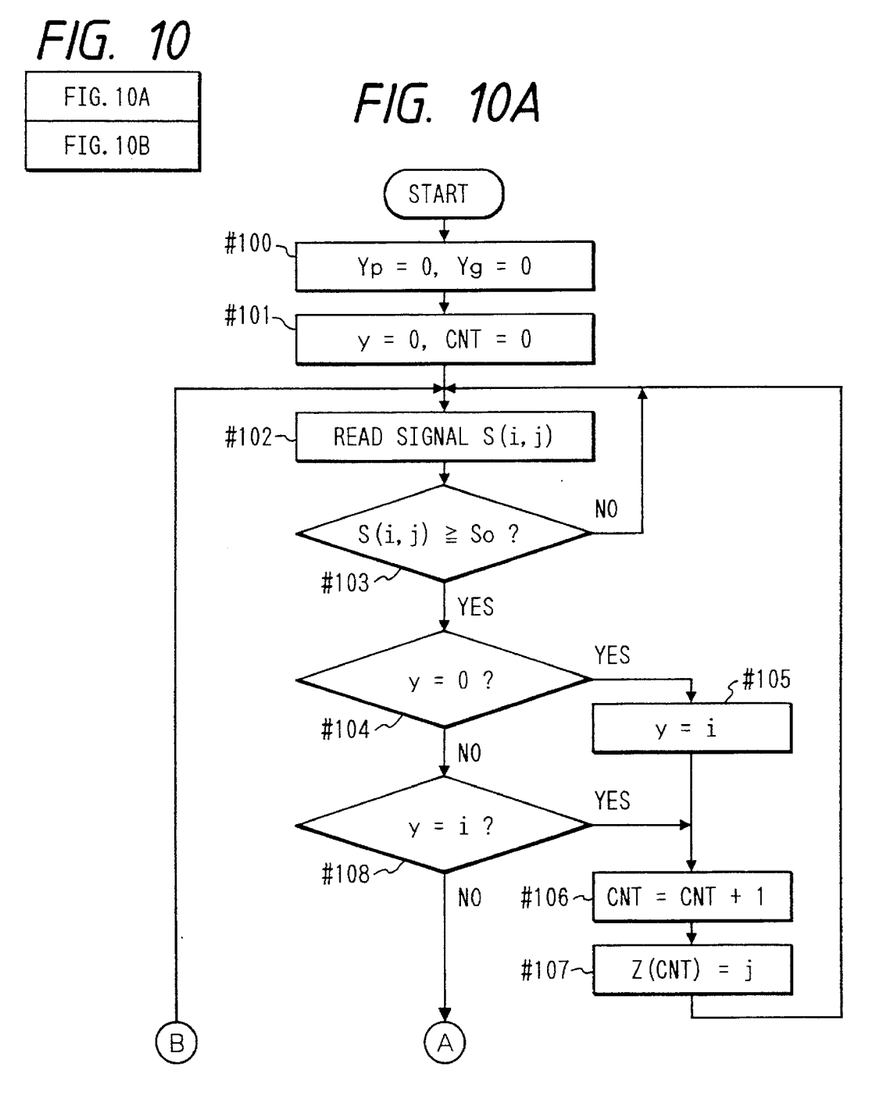
Figure 10B:
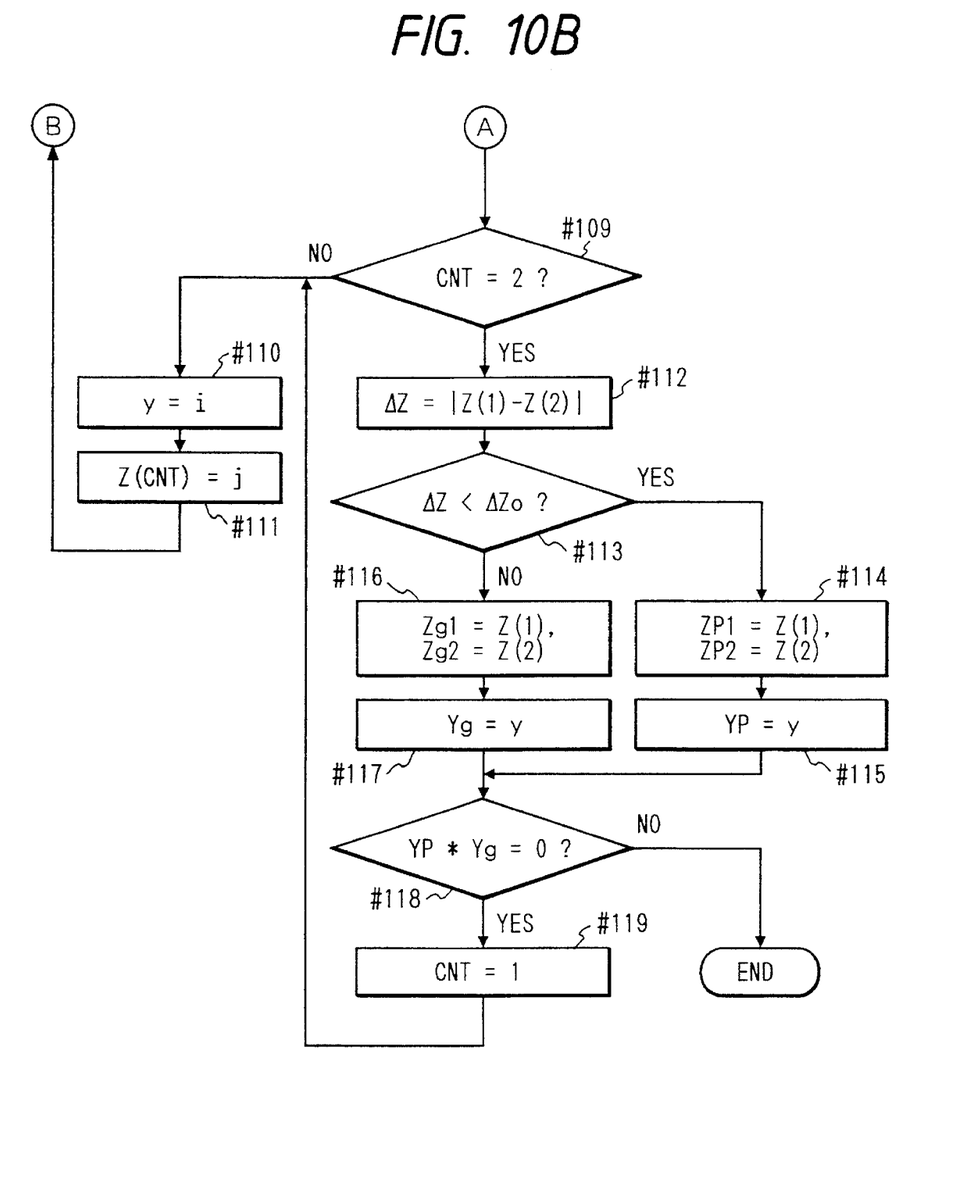

FIGS. 7 and 8 are developed illustrations showing the optical path of the detecting unit when the observer is observing by the naked eye and when the observer is using spectacles, respectively, FIG. 9A is a schematic illustration of the image of the eyeball of the observer using spectacles which is formed on the image sensor 54, FIGS. 9B and 9C show output intensities on the lines Yg and Yp, respectively, of the image sensor 54, and FIGS. 10A and 10B are flow charts when detecting whether the photographer is using spectacles.

When as shown in FIG. 8, the observer is using spectacles 84, part of the illuminating light emitted from the infrared light emitting diodes 20a and 20b is reflected by a first surface 84a of the spectacles 84 (that surface which is outer to the observer's eyeball) and enters the image sensor 54 through the imaging lens 22. It is FIG. 9A that shows the eyeball image formed on the image sensor 54 at this time.

In FIG. 9A, the image formed by the light reflected by the first surface 84a of the spectacles 84 is shown as the reflection image of the spectacles. Two such reflection images are usually created on the same line because two infrared light emitting diodes 20a and 20b are used.

Another reflection image of the spectacles may be formed by the light reflected by a second surface 84b of the spectacles 84, but it is omitted in the present embodiment.

FIG. 9B shows the output intensity of the line Yg on which the reflection image of the spectacles is created, and the reflection image of the spectacles is detected with higher intensity than the reflection image of the cornea because the reflectance of the spectacles is high.

Also, the radius of curvature of the first surface 84a of the spectacles 84 is usually greater than the radius of curvature of the cornea 81 and therefore, the spacing between the two created reflection images of the spectacles is greater than the spacing between the two reflection images of the cornea.

In the present embodiment, as described above, the differences between the reflection images of the spectacles and the reflection images of the cornea, such as the intensity, the spacing and the imaged position, are detected to thereby detect whether the observer is using spectacles, i.e., the observation state.

The flow of the detection of the observation state will now be described with reference to the flow charts of FIGS. 10A and 10B.

When the detection is started, the line Yp for the creation of the reflection images of the cornea and the line Yg for the creation of the reflection images of the spectacles are first reset to zero (#100). Further, the parameter y of line information and count parameter CNT are reset to zero (#101).

The parameter y assumes the value of the number of the line on which it is judged that the reflection images of the spectacles or the reflection images of the cornea are created. Also, the count parameter CNT is the number of the reflection images of the spectacles or the reflection images of the cornea created on the same line.

Subsequently, the reading-out of the signal S(i, j) of the eyeball image already stored in the memory of the calculation processing unit 59 is done in the order of lines (#102), i and j are positive integers.

The reflection images of the spectacles and the reflection images of the cornea are substantially equal to mirror surface reflection and are therefore strong in intensity, and assuming that the threshold value of the intensity by which the reflection images of the spectacles or the reflection images of the cornea can be discriminated is So, if the signal S(i, j) is smaller than the intensity So (#103), the reading-out of the next signal S(i, j) is effected (#102). Also, if the signal S(i, j) is of a magnitude greater than the intensity So (#103), it is judged that the signal S(i, j) is the signal of the reflection image of the spectacles or the reflection image of the cornea.

If at this time, the signal of the reflection image of the spectacles or the reflection image of the cornea is not detected until that point of time and the parameter y of the line information is zero (#104), the parameter y representative of the line for creation of the reflection images of the spectacles or the reflection images of the cornea is set to y=i (#105).

Further, 1 is added to the count parameter CNT representative of the number of the reflection images of the spectacles or the reflection images of the cornea on the parameter y (=i) of the line information (#106) and the position j at which the reflection images of the spectacles or the reflection images of the cornea are created is recorded as Z(CNT)=j (#107). The reading-out of the next signal (i, j) is then effected (#102).

Also, when the signal S(i, j) is of intensity So or greater (#103) and the parameter y of the then line information is not zero (#104), the discrimination of the value of the parameter y is effected. If the parameter y of the line information coincides with the line number i which is effecting the reading-out of the signal S(i, j) (#108), 1 is added to the count parameter CNT representative of the number of the reflection images of the spectacles or the reflection images of the cornea (#106) and the position j at which the reflection images of the spectacles or the reflection images of the cornea are created is recorded as Z(CNT)=j (#107). The reading-out of the next signal S(i, j) is then effected (#102).

On the other hand, if the parameter y of the line information does not coincide with the line number i which is effecting the reading-out of the signal S(i, j) when the discrimination of the value of the parameter y of the line information has been effected (#108), it is judged that the reading-out of the signal S of the parameter y of the line information has already been terminated, and the discrimination of the count parameter CNT is effected (#109). When the count parameter CNT is not 2 (when CNT=i), only one signal S judged to be the reflection image of the cornea is created on the parameter y of the line information and as a result, the position information Z(1) already recorded is judged to be some ghost which is not the reflection image of the spectacles and the reflection image of the cornea.

The parameter y of the line information is then substituted for by a line number i in which the reading-out of the signal S is being effected (#110), and the position j at which the reflection images of the spectacles or the reflection images of the cornea are created at that time is recorded as Z(CNT)=j (#111). The reading-out of the next signal S (i, j) is then effected (#102).

Also, if the count parameter CNT is 2 when the discrimination of the count parameter CNT has been effected (#109), the spacing $\Delta Z$ between two positions at which the reflection images of the spectacles or the reflection images of the cornea already recorded are created is found as $\Delta Z=|Z(1)-Z(2)|$ (#112).

The spacing between two created images differs between the reflection images of the spectacles and the reflection images of the cornea and therefore, assuming that the threshold value of the spacing between the images at which each image can be discriminated is $\Delta Zo$, if the aforementioned spacing $\Delta Z$ is smaller than the predetermined threshold value $\Delta Zo$ (#113), it is judged that the positions Z(1) and Z(2) of the recorded images are the positions of the reflection images of the cornea, and the positions Z(1) and Z(2) are set to Zp1=Z(1) and Zp2=Z(2), respectively, as the positions of the reflection images of the cornea (#114). Here, Zp1 and Zp2 are equivalent to Ze' and Zd' in FIG. 3B. Further, the line Yp for the creation of the reflection images of the cornea is set to Yp=y (#115).

Also, if the aforementioned spacing $\Delta Z$ is greater than the predetermined threshold value $\Delta Zo$ (#113), it is judged that the positions Z(1) and Z(2) of the recorded images are the positions of the reflection images of the spectacles, and the positions Z(1) and Z(2) are set to Zg1=Z(1) and Zg2=Z(2), respectively, as the position of Q3(#116). Further, the line Yg for the creation of the reflection images of the spectacles is set to Yg=y (#117).

Subsequently, whether both of the reflection image of the spectacles and the reflection image of the cornea have been detected is judged. If the product of Yg and Yp representative of the lines for the creation of the respective images is zero, it is judged that one of the reflection image of the spectacles and the reflection image of the cornea is not yet detected (#118). So, the count parameter CNT is set to 1 (#119), and the detection of the undetected image is continued (#110–#111, #102). If the product of Yg and Yp representative of the lines for the spectacles and the reflection image of the cornea is not zero, it is judges that both of the reflection image of the spectacles and the reflection image of the cornea have been detected (#118) and the detection of whether the spectacles are used is terminated.

In the flow of this calculation, description has been made on the premise that the observer is using spectacles, but when the observer is not using spectacles, all image signals of the image sensor 54 are read out, whereafter from the fact that the value of the line Yg for the creation of the reflection image of the spectacles remains zero, the calculation processing unit 59 can detect that the observer is not using spectacles.

Also, in the flow of this calculation, description has been made on the premise that the number CNT of the reflection images of the spectacles or the reflection images of the cornea created on the same line is 2 or less, but the number CNT may be set to a value greater than 2 on the supposition that some ghost or the like is created on the same line. At this time, the distinction between the reflection image of the spectacles or the reflection image of the cornea and the ghost is generally possible by comparing the positions at which these images are created.

When the size of the reflection image of the spectacles or the reflection image of the cornea created on the image sensor is large and a signal S exceeding the intensity So is continuously detected, it is desirable that the position of the centroid of the continuously detected signal S be defined as the position of the reflection image of the spectacles or the reflection image of the cornea.

Also, in the present embodiment, there has been shown an example in which the distinction between the reflection images of the spectacles and the reflection images of the cornea is made on the basis of the spacing between the images, but since the reflection images of the spectacles are greater in intensity than the reflection images of the cornea, distinction may be made on the basis of the absolute value of the intensity of the images.

Further, the positional relation between the lines on which the reflection image of the spectacles and the reflection image of the eyeball are created may be prestored in a memory portion and the positional relation between the lines on which reflection images exceeding the intensity So have been created may be compared with the positional relation between the reflection image of the spectacles and the reflection image of the eyeball recorded in the memory portion, whereby the detection of the observation state may be effected, or detection may be effected by a combination of these.

In the present embodiment, as described above, when the observation state is detected by the detecting unit 53, the eyepiece 9 is moved by the driving unit 17 on the basis of the date pre-stored in the memory portion 59c in conformity with the observation state to thereby adjust the diopter of the finder.

While in the present embodiment, the adjustment of diopter is effected by the eyepiece 9 being moved in the direction of the optical axis of the finder optical system by the driving unit 17, this is not restrictive, but rather, the diopter may be adjusted by a lens for diopter correction being removably inserted into the optical path of the finder. For example, as the lens for diopter correction, a lens of such refractive power that the observer can obtain appropriate diopter by the naked eye when the lens is located in the optical path of the finder may be pre-selected and disposed and if the observation state detected by the detecting unit is naked eye, the lens may be located in the optical path of the finder, and if the observer is using spectacles, the lens may be retracted out of the optical path, whereby the adjustment of diopter may be effected.

On the other hand, in the present embodiment, when the use of spectacles is detected, the optical construction of the detecting unit 23 is adjusted with the above-described correction of diopter.

Generally, the position of the eyes of an observer using spectacles for a shortsighted person is ten and several millimeters farther than the position of the eyes of an observer not using spectacles. Therefore, when it is detected by the calculation processing unit 59 that the observer is using spectacles, a pawl 11 mounted on a lens frame for holding the auxiliary lens 57 is pulled in +2 direction by a driving device, not shown, whereby the auxiliary lens 57 which is a concave lens is set in the optical path.

As a result, the eyes of the observer using spectacles as the optical system of the detecting unit and the image sensor 54 substantially satisfies a conjugate relation through the dichroic mirror 51a to thereby provide a good imaging state. As long as the auxiliary lens 57 is set in the light receiving optical path of the detecting unit, the pawl 11 is held in engagement with a pawl 12 mounted on the lens barrel of the imaging lens 22.

Also, when it is detected by the detecting unit 53 that the observer is not using spectacles, the pawl 12 releases the pawl 11 and as shown in FIG. 7, the auxiliary lens 57 is set in a state retracted from the light receiving optical path. Thereby, the construction of the optical system of the detecting unit 53 is adjusted.

While in the present embodiment, there has been shown an example in which the auxiliary lens 57 is removably inserted into the optical path of the optical system of the detecting unit, whereby the optical system of the detecting unit is adjusted so as to satisfy the conjugate relation between the observer's eyes and the image sensor 54 of the detecting unit, this is not restrictive, but the position of the imaging lens 22 constituting the optical system of the detecting unit may be moved in the direction of the optical axis to thereby effect said adjustment. In this case, the imaging lens 22 may be comprised of a plurality of lenses, some of which may be moved on the optical axis.

According to the present embodiment, diopter correction can be automatically effected by a simple construction in which the various elements (such as the light source and the light divider) of the visual axis detecting means and the diopter correcting means are used in common.

Also, even when use is made of spectacles of which the diopter does not match the observer, an appropriately preset correction value is used and therefore, appropriate diopter is always obtained to thereby make the apparatus easy to use.

Figure 11:
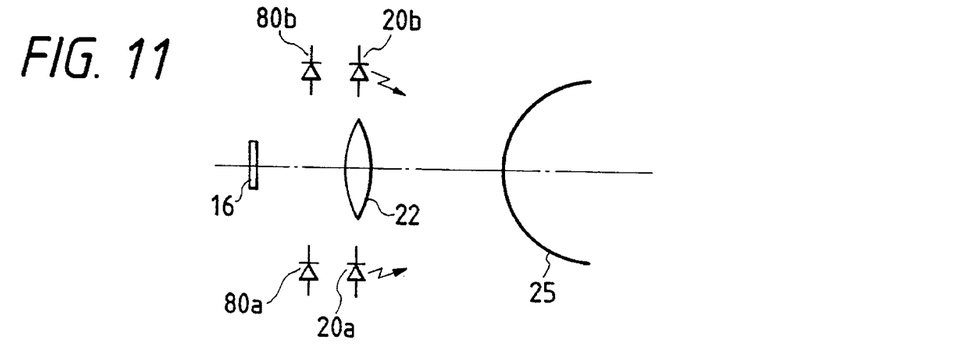
FIG. 11 is an enlarged illustration of portions of Embodiment 3 of the present invention.

FIG. 11 is a schematic view showing the essential portions of Embodiment 3 of the present invention. This embodiment differs from Embodiment 1 of FIG. 1 in that the light emitting portions of the light source are disposed in predetermined spaced apart relationship with each other and the difference (differential) information between the reflection images of the respective light emitting portions is used to detect observation information, and is substantially the same as Embodiment 1 in the other points.

In FIG. 11, the reference characters 80a and 80b designate iRLEDs which illuminate the observer's eyeball 25 at an angle differing from that of iRLEDs 20a and 20b.

In the present embodiment, the differential information of the reflection image based on the iRLEDs 20a, 20b and the reflection image based on the iRLEDs 80a, 80b is obtained to thereby find the curvature of the reflecting surface. Thereby, whether the observer is using contact lenses can also be detected with good accuracy.

In each of the above-described embodiments, the adjustment of diopter conforming to the detected observation state may be that in which diopter correction is not effected (is returned to ordinary diopter, i.e., diopter at which any observer of normal eyesight can appropriately observe).

Also, in the above-described embodiments, when the use of spectacles has been detected, the finder optical system may be adjusted to preset diopter and also, at least a portion of the finder optical system may be moved and the distance from the eyepiece to the eye point may be set so as to become longer than that in the case of the naked eye.

According to the present invention, there can be achieved an optical apparatus having diopter correcting means in which the observation state of an observer looking into an optical system is detected and at least a portion of the optical system is moved on the basis of the observation state, whereby the simplification of the entire apparatus is contrived and yet appropriate diopter correction can be easily effected even in different observation states.

What is claimed is:
1. A diopter correcting apparatus comprising:
   optical lens means for performing diopter correction;
   detecting means for detecting whether an observer is wearing corrective lenses;
   memory means storing therein data regarding a position of said optical lens means in accordance with a result of the detecting performed by said detecting means; and driving means for driving said optical lens means on the basis of the data stored by said memory means.

2. A diopter correcting apparatus according to claim 1, wherein said memory means further stores therein first data regarding the position of said optical lens means in a state in which an observer is wearing spectacles, and second data regarding the position of said optical lens means in a state in which the observer is not wearing spectacles.

3. A diopter correcting apparatus according to claim 2, wherein said detecting means detects whether the observer is wearing corrective lenses.

4. A diopter correcting apparatus according to claim 3, wherein said driving means drives said optical lens means on the basis of the first data when said detecting means detects that the observer is wearing corrective lenses.

5. A diopter correcting apparatus according to claim 3, wherein said driving means drives said optical lens means on the basis of the second data when said detecting means detects that the observer is not wearing corrective lenses.

6. A diopter correcting apparatus according to claim 1, wherein the corrective lenses detected by said detecting means are spectacles.

7. A diopter correcting apparatus according to claim 1, wherein the corrective lenses detected by said detecting means are contact lenses.

8. A diopter correcting apparatus according to claim 3, wherein the corrective lenses detected by said detecting means are spectacles.

9. A diopter correcting apparatus according to claim 3, wherein the corrective lenses detected by said detecting means are contact lenses.

* * * * *

UNITED STATES PATENT AND TRADEMARK OFFICE
CERTIFICATE OF CORRECTION

PATENT NO. : 5,619,739
DATED : April 8, 1997
INVENTOR(S) : Kawabata

It is certified that error appears in the above-indentified patent and that said Letters Patent is hereby corrected as shown below: On the title page, item:

[56]  FOREIGN PATENT DOCUMENTS:

"4138431  5/1992  Japan.
 4138432  5/1992  Japan." should read
--4-138431  5/1992  Japan.
  4-138432  5/1992  Japan.--.

COLUMN 4:

Line 58, "Low" (second occurrence) should read --High--.

COLUMN 8:

Line 47, "(#102)," should read --(#102), where--.

COLUMN 10:

Line 20, "judges" should read --judged--.

Signed and Sealed this

Fourth Day of November, 1997

Attest:

BRUCE LEHMAN

Attesting Officer

Commissioner of Patents and Trademarks